United States Patent [19]
Doremus

[11] Patent Number: 4,577,662
[45] Date of Patent: Mar. 25, 1986

[54] PLUG VALVE EQUIPPED WITH PRESSURE EQUALIZATION MEANS

[75] Inventor: Bernard Doremus, Echouboulains, France

[73] Assignee: Schlumberger Technology Corporation, New York, N.Y.

[21] Appl. No.: 574,237

[22] Filed: Jan. 26, 1984

[30] Foreign Application Priority Data

Jan. 28, 1983 [FR] France ............... 83 01725

[51] Int. Cl.⁴ ............ F16K 5/06; F16K 39/00
[52] U.S. Cl. ............ 137/630.14; 137/630.21; 251/368
[58] Field of Search ......... 137/630.14, 630.15, 137/630.19, 630.21

[56] References Cited

U.S. PATENT DOCUMENTS

| 297,986 | 5/1984 | Goldsmith | 137/630.21 |
| 541,716 | 6/1895 | Callahan | 137/630.14 |
| 2,879,800 | 3/1959 | Komrosky | 137/630.15 |
| 3,030,982 | 4/1962 | Navara | 137/630.19 |

Primary Examiner—Robert G. Nilson

[57] ABSTRACT

Disclosed is a plug valve comprising displacement means (5) allowing equalization of upstream and downstream pressures existing on the plug (3), said equalization means being applied before the plug has been moved.

4 Claims, 6 Drawing Figures

PLUG VALVE EQUIPPED WITH PRESSURE EQUALIZATION MEANS

The present invention relates to a plug valve including pressure equalization means.

In a closed plug valve the difference in pressure between the upstream and downstream sides of the plug creates forces which are exerted on said plug of the valve and which have a tendency to crush it on the sealing seat located downstream of the valve. The result is that the opening of the valve, which takes place by rotating the plug, requires a significant torque in order to overcome the friction due to these crushing forces. The greater the difference in pressure exerted on the plug, the higher will this torque be.

There are prior-art devices allowing the equalization of pressure upstream and downstream of valve plugs.

These devices generally have the drawback of requiring prior movement of the valve plug to obtain pressure equalization upstream and downstream of the valve. This prior movement thus takes place under the action of pressure forces existing on each side of the plug and, although limited, does not completely eliminate the drawback mentioned above.

As an example, such a device is described in U.S. Pat. No. 3,883,113 of May 13, 1975 filed by ACF Industries. This device includes a flare on the internal lips of the passage of the plug which, when rotated to go to the open position, constricts the flow of fluid retained by the valve, thereby creating a gradual flow of the fluid stream.

U.S. Pat. No. 4,293,163 filed by Texas Iron Works also does not eliminate entirely the forces generated by the difference in pressure existing upstream and downstream of the plug in that the pressure existing upstream of the plug is directed to the periphery of the plug by suitable means, but it is not applied downstream of the plug before the latter is moved.

Prior-art valves are generally equipped with one or more seals on the upstream seat of the valve. These seals, owing to the forces generated by the difference in the upstream and downstream pressures existing on the plug, are subjected to crushing forces leading to their rapid deterioration, especially during the movement of the plug.

The invention provides a device not exhibiting the drawbacks mentioned above, in particular in that the force necessary for moving the plug to open the valve when it is subjected to a pressure difference between the upstream and downstream sides of said plug is practically zero. The result is that the wear of the sealing seats is practically nonexistent. Another advantage is that it is then possible to measure the pressure upstream of the plug from the downstream part of the valve without the plug of said valve being in the open position.

More precisely, the invention provides a plug valve comprising a valve body, equipped with a plug pierced with a throughgoing passage allowing comunication between the upstream side and the downstream side of the valve body, as well as displacement means for moving said plug, going in a sealed manner through said valve body, characterized in that it includes pressure equalization means upstream and downstream of said valve, without prior movement of said plug, said pressure equalization means including at least one bore within said plug displacement means, establishing pressure communication between the upstream and downstream sides of said valve when said displacement means have been turned by a given angle from an extreme position, said displacement means acting on said plug to open said valve only after they have turned by said given angle.

According to an advantageous feature of the invention, the valve has only one seal.

The invention will be better understood from the following description of an embodiment of the invention given by way of nonlimitative illustration. The description refers to the accompanying drawings in which.

Figure 1:
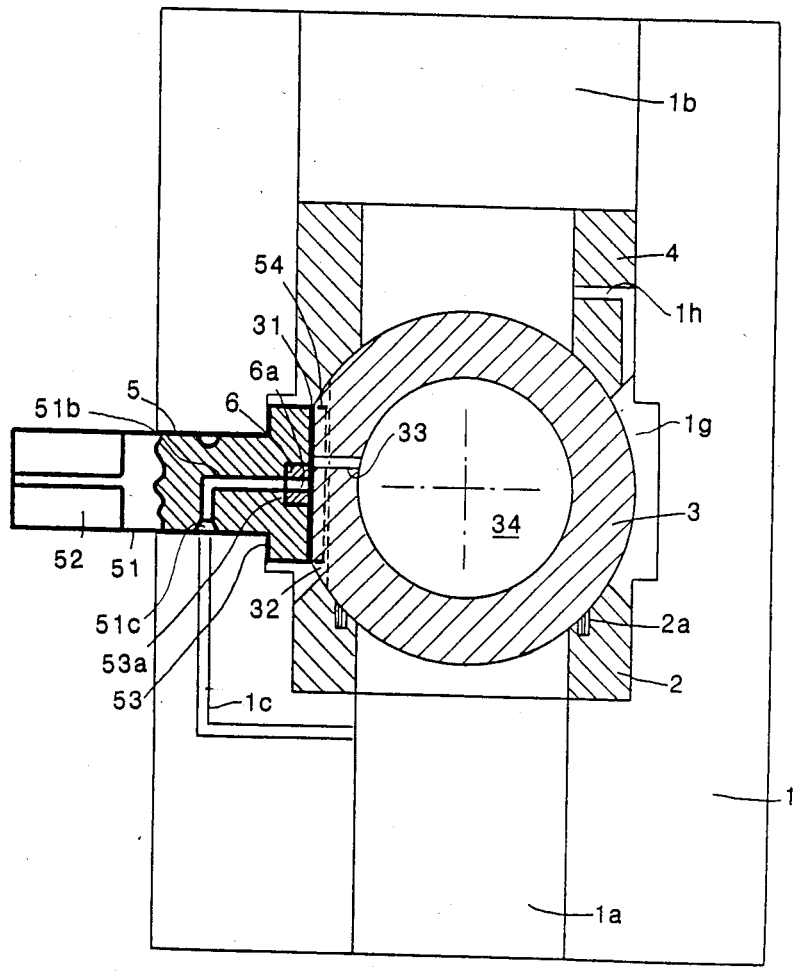
FIG. 1 represents a longitudinal section of a schematic diagram of the invention.

In FIG. 1 it is seen that the valve body 1 is installed in a conduit through which the direction of fluid flow takes place from the upstream part 1a toward the downstream part 1b of the valve body 1.

The valve body contains an upstream plug seat 2 equipped with a seal 2a. The seal 2a provides tightness on the plug 3 which, in the case of the figure, is a spherical plug shown in the closed position.

The plug 3 is inserted between the upstream plug seat 2 and the downstream plug seat 4.

It is to be noted that, in the present invention, no seal is provided on the downstream seat 4. The downstream seat 4 takes up all the forces due to the difference in pressure existing on the plug. The metal-to-metal contact existing between this downstream seat 4 and the spherical plug 3 involves only a small part of the sealing of the valve provided by the seal 2a which is subjected only to minimal forces.

The rotation of the plug is achieved by means of displacement means 5 shown in bold lines. These displacement means consist of a cylindrical pin 51 equipped with a square drive 52, a cylindrical shoulder 53 having a spot facing 53a containing an insert 6 of tungsten carbide and equipped with an opening 6a in contact with a flat surface 31 machined on the spherical plug so as to ensure a metal-to-metal type sealing.

The displacement means 5 also include a plug drive boss 54 fitting into a groove 32 machined in said plug to move it.

With reference to FIG. 1, a passageway 1h located in the seat element 4 connects the downstream portion 1b of the fluid flow passage of the valve body 1 with an annular channel 1g which surrounds the ball element 3 for communication with the internal passage 34. As shown in FIG. 1, a lateral channel or orifice 33 is provided between the internal passage 34 and the flat surface 31 of plug 3. An equalization channel 1c connects the upstream position 1a of the fluid flow passage of the valve body 1 with a point adjacent the pin 51 of the displacement means 5. A passageway or bore 51b in pin 51 connects a toroidal groove 51c in pin 51 formed adjacent the opening of the channel 1c with the opening 6a of the insert 6. The bypass channel 1c, passageway 51b and lateral channel 33 cooperate to provide pressure equalization prior to opening of the valve.

Figure 2:
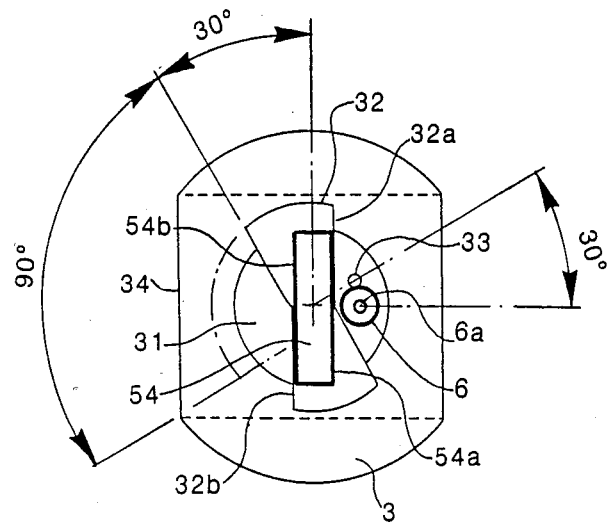
FIG. 2 represents a front view of the plug in the closed position without equalization.
Figure 3:
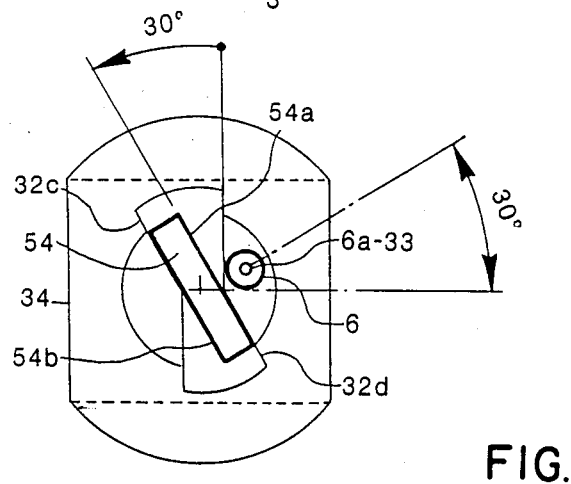
FIG. 3 represents a front view of the plug in the closed position with equalization.
Figure 4:
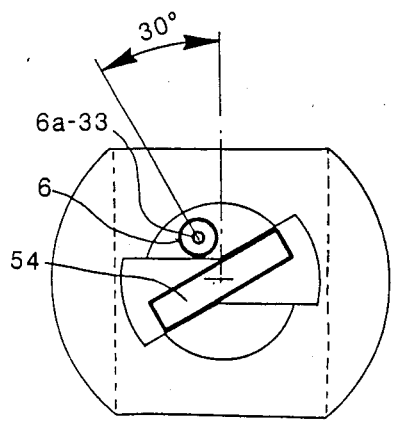
FIG. 4 represents a front view of the plug in the open position.

FIGS. 2, 3 and 4 illustrate more precisely how the spherical plug moves and how the prior equalization of upstream and downstream pressures takes place before the spherical plug has been moved.

In these figures, the boss 54 driving the spherical plug 3 as well as the contour of the insert 6 with its opening 6a are shown in unbroken bold lines so as to facilitate the understanding of the equalization system operating before the rotation of the spherical plug 3.

In the same figures, the spherical plug is shown in unbroken thin lines. It is noted that the particularity of the groove 32 is that it has a bi-trapezoidal shape, allowing the boss 54 to rotate by 30 degrees from an extreme position without the movement of the plug.

FIG. 2 shows the plug in the closed position. The boss 54 is in an extreme clockwise position. The right flank 54a of the boss is in contact with the flank 32a of the bi-trapezoidal groove 32, and the left flank 54b is in contact with the flank 32b of the bi-trapezoidal groove. In this position, the opening 6a of the insert 6 is offcentered by 30 degrees in relation to an orifice 33 provided in the spherical plug and establishing communication between the flat surface 31 of the plug and the internal passage 34 of the plug.

FIG. 3 shows the plug in the closed position, but the boss 54 has undergone a counterclockwise rotation of 30 degrees so that its left flank 54b is now in contact with the flank 32c of the bitrapezoidal groove and its right flank 54a is in contact with the flank 32d of the bi-trapezoidal groove. In this position, the opening 6a of the insert 6 is opposite the orifice 33 provided in the spherical plug, thereby establishing communication between the internal passage 34 of the plug and the opening 6a of the insert 6. This position is the equalization position.

FIG. 4 shows the spherical plug in the open position following an additional 90-degree counterclockwise rotation of the boss 54. During this new 90-degree rotation, the opening 6a of the insert 6 remains opposite the orifice 33 provided in the plug.

It is to be noted that the opposite operation of valve closing is accomplished by a first 30-degree clockwise rotation of the boss 54, also having the effect of offcentering the opening 6a from the orifice 33 and hence closing the communication between the internal passage 34 and the opening 6a, and then an additional 90-degree clockwise rotation of the boss 54 which brings the plug to the closed position. This brings us to the situation in FIG. 2.

Figure 5:
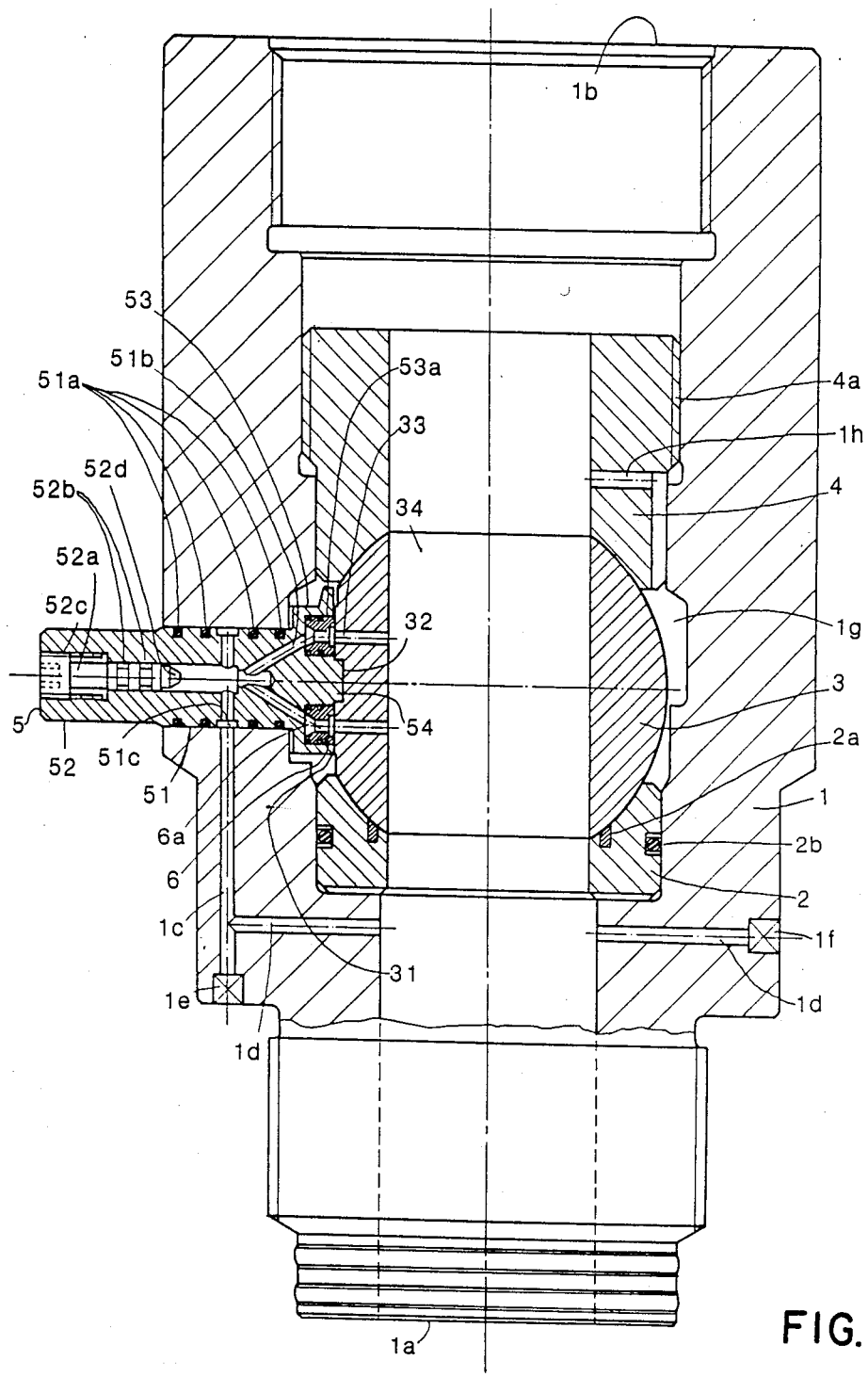
FIG. 5 represents a longitudinal section of an embodiment of the invention.

FIG. 5 represents a longitudinal section of the preferred embodiment of the invention. In this figure, the displacement means are shown in the equalization position, i.e. after a 30-degree counterclockwise rotation in relation to the totally closed position.

In this figure, the valve body 1 is installed in a conduit in which fluid flows from the upstream part 1a to the downstream part 1b of the valve body 1.

The valve body 1 contains an upstream plug seat 2 equipped with a seal 2a as well as a O-ring seal 2b. The seal 2a provides sealing on the plug 3, which in the case of the figure, is a spherical plug. The O-ring seal 2b seals the upstream seat 2 on the valve body 1. The plug 3 is inserted between the upstream seat 2 and the downstream seat 4 threaded on its external upper part 4a so as to be able to move longitudinally in the valve body, thereby allowing a fine adjustment of the plug 3 against the seal 2a of the upstream seat 2.

No seal is provided on the downstream seat 4. The downstream seat 4 takes up all the forces due to the difference in pressure existing on the plug. The metal-to-metal contact existing between this downstream seat 4 and the plug 3 involves only a small part of the sealing of the valve provided by the seal 2a which is subjected only to minimal forces. The rotation of the plug is obtained by means of displacement means 5. These displacement means 5 consist of a cylindrical pin 51 equipped with O-ring seals 51a, a square drive 52, a cylindrical shoulder 53 with two spotfacings 53a containing inserts in tungsten carbide 6 equipped with openings 6a and in sealed metal-to-metal contact with a flat surface 31 machined on the spherical plug 3. The displacement means 5 include a boss 54 driving the plug and fitting into a groove 32 of said plug so as to rotate it. The drive square 52 can be coupled with rotation means (not shown) which may be mechanical, such as a flywheel, or hydraulic.

It is noted that, in the equalization position shown, the openings 6a of the tungsten carbide inserts 6 are positioned opposite the orifices 33 provided in the plug 3, thereby allowing communication between the internal passage 34 of the plug and bores 51b provided in the displacement means 5. These displacement means are themselves in constant communication with an equalization channel 1c provided in the valve body 1, through a toroidal groove 51c made on the cylindrical part 51 of said communication means. The channel 1c is connected to the upstream part of the plug by a radial channel 1d provided in the valve body 1. The plugs 1e and 1f are installed only after drilling channels 1c and 1d which are made in the manner shown to facilitate machining.

The internal passage 34 of the plug, when it is in the closed position, is in communication with a toroidal hollow 1g made in the valve body 1 and itself communicating through a channel 1h provided in the downstream seat 4 with the downstream part 1b of the valve.

In this equalization position, the communication of the downstream part 1b of the valve with the upstream part 1a of said valve is thus obtained by means of the channel 1h, the toroidal hollow 1g, the internal passage 34 of the plug 3, bores 51b provided in the displacement means 5, the groove 51c and channels 1c and 1d. The equalization of upstream and downstream pressures is thus totally achieved.

It is to be noted that the displacement means 5 for moving the spherical plug 3 are provided with an internal plugging element 52a equipped with two O-ring seals 52b and threaded on its external part 52c so as to allow the plugging, by a needle 52d, of the bores 51b of said displacement means when the valve is closed, in order to isolate from the upstream pressure the metal-to-metal sealing contacts of the tungsten carbide inserts 6 on the flat surface 31 of the plug. This has the obvious advantage of preserving these contacts in the case of long valve closing periods, particularly when the fluids conveyed in the conduit are corrosive.

Figure 6:
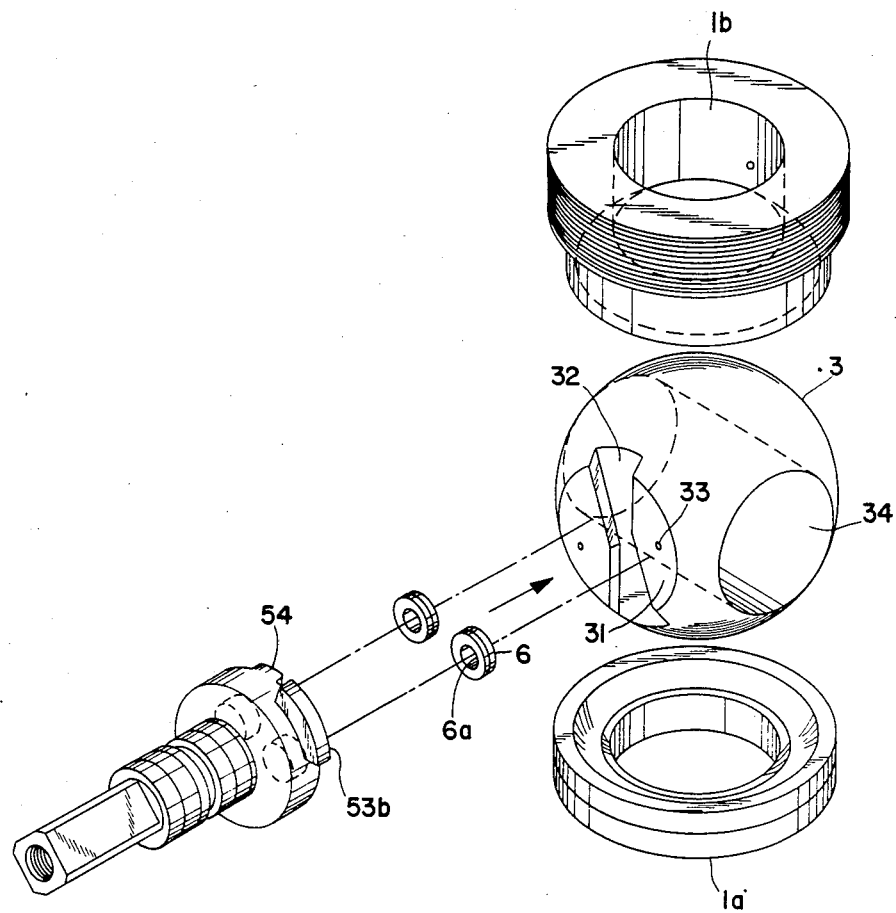
FIG. 6 represents an exploded perspective view of the device seen from the side of the plug displacement means, with the plug in the closed position without equalization.

FIG. 6 shows more clearly how the plug drive boss 54 fits into the groove 32 of the plug 3. This groove is characterized by its bi-trapezoidal shape allowing 30-degree rotation by the displacement means 5 from an extreme contact position without the plug having been moved. The stop 53b serves to stop the displacement means in their extreme operating positions.

From the preceeding, the result is that, during this 30-degree rotation of the displacement means, the openings 6a of the tungsten carbide inserts 6 are positioned opposite the orifices 33 provided in the spherical plug 3 and located in the plane of the flat surface 31. The 30-degree rotation allowing pressure equalization on the upstream side 1a and the downstream side 1b of the valve is followed by a 90-degree rotation making it possible to open the valve for the total flow in the conduit, with a low and limited torque used only to overcome the minimal friction forces of the plug on the seats under equal pressure. It is to be noted that the invention has the advantage of allowing the measurement of the pressure existing upstream of the valve, using suitable means located in the downstream part of the valve, without the valve being open to the total flow of fluid going through it when it is in the open position, and hence under a low flow rate.

It goes without saying that the present invention is not limited to the embodiments described here for illustrative and nonlimitative purposes. For example, it is possible to consider the replacement of the spherical plug by a cylindrical or conical plug.

I claim:

1. A plug valve comprising:
    a valve body having a fluid flow passage therein;
    a ball element having an outer surface and a bore therethrough, said ball element being sealingly received within said valve body for rotation from a valve-closed position in which fluid flow between upstream and downstream portions of said flow passage is blocked to a valve-open position in which said fluid flow is permitted;
    displacement means for rotating said ball element sealingly crossing through said valve body and having a pin, the longitudinal axis of which is substantially perpendicular to said bore; and
    means for equalizing pressure between said upstream and downstream portions of said flow passage prior to movement of said ball element from said valve-closed to said valve-open positions, including means communicating pressure between said bore of said ball element and one of said upstream and downstream portions of said flow passage, at least one lateral channel within said ball element connecting said bore with said outer surface, at least one passageway formed within said pin, and a bypass channel formed within said valve body; said lateral channel, passageway and bypass channel being arranged to establish pressure communication between said bore and the other of said upstream and downstream portions of said flow passage when said pin is turned by a given angle from an extreme position to bring said lateral channel, said passageway and said bypass channel into alignment; and said displacement means acting on said ball element to open said valve only after said pin has turned by said angle.

2. A plug valve as in claim 1, wherein said outer surface of said ball valve has a flat surface, wherein said passageway in said pin has an enlarged end section, and further comprising an insert with an opening fitted into said enlarged end section, one side of said insert moving in a sealed manner over said flat surface when said pin is moved.

3. A plug valve as in claim 1 or claim 7, wherein the end of said displacement means located near said ball element includes a driving boss fitted into a groove of said ball element, said boss being capable of movement by said given angle in said groove without driving said ball element.

4. A plug valve as in claim 1 or claim 7, wherein said ball element is maintained in said valve body by means of a downstream seat and an upstream seat, said upstream seat comprising a seal to provide tightness between said ball element and said upstream seat, said downstream seat being mounted movably in said valve body to adjust the contact force between said ball element and said seal.

* * * * *